Oct. 6, 1953  H. R. DE VLIEG  2,654,610
OFFSET BORING HEAD
Filed May 10, 1950
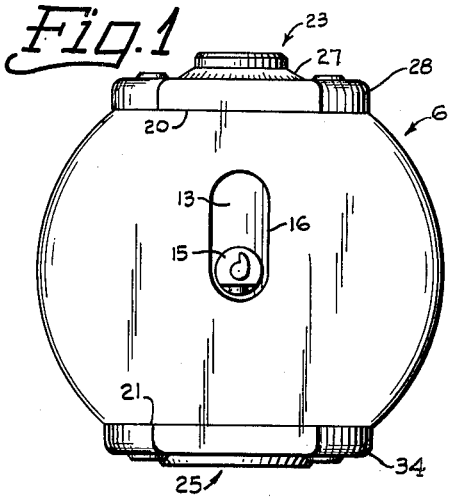
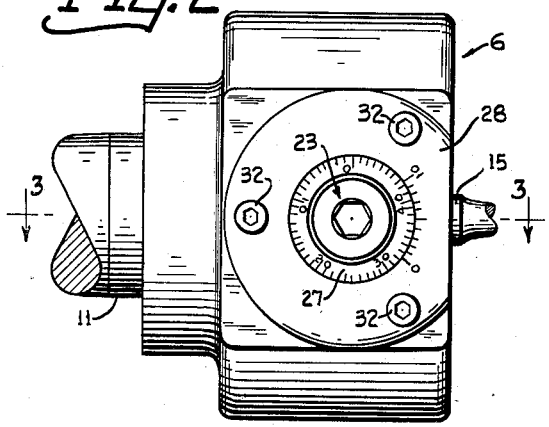
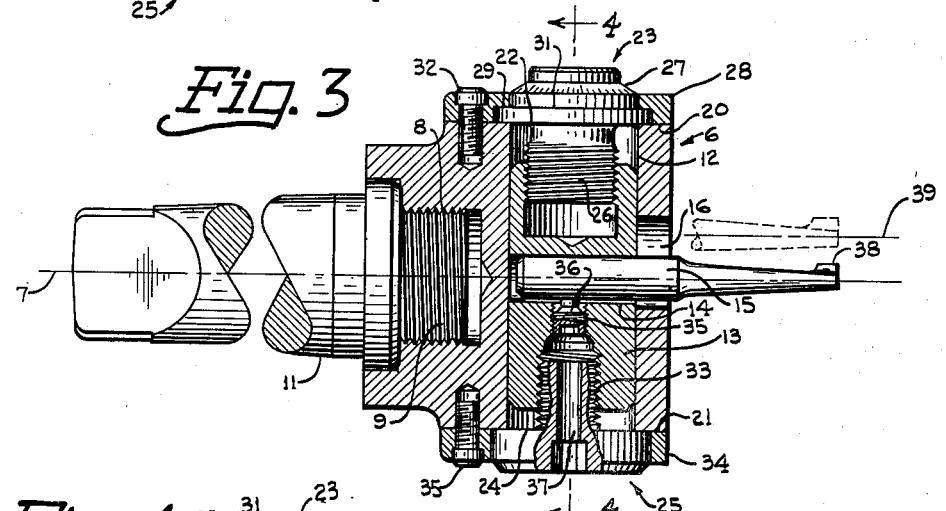
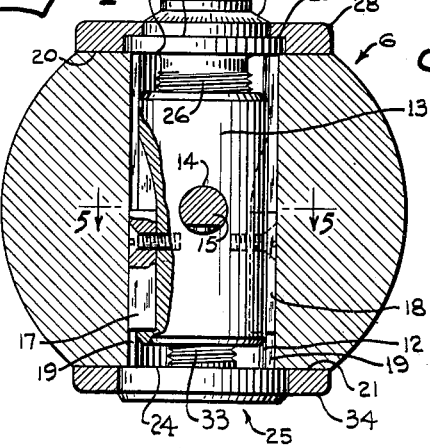
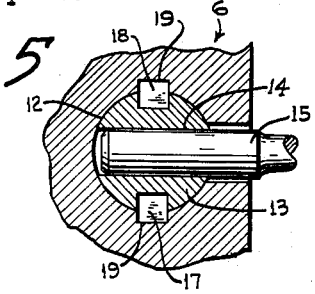
INVENTOR.
Howard R. De Vlieg
BY
McCanna & Morsbach
ATTORNEYS Patented Oct. 6, 1953

2,654,610

UNITED STATES PATENT OFFICE 2,654,610

OFFSET BORING HEAD

Howard R. De Vlieg, Grosse Pointe Woods, Mich.

Application May 10, 1950, Serial No. 161,091

5 Claims. (Cl. 279—6)

1

This invention relates to cutter heads of the type commonly known as off-set boring heads. These are used in machine tool practice, both in jig boring and production boring, where a high degree of precision is desired in size and location of holes, particularly in small holes ranging from about ⅛" to 1" in diameter. This is sometimes referred to as single point boring. Increments of adjustment of the cutting tool contemplated by my invention are in the region of .0001".

One of the objects of my invention is to provide an improved off-set boring head of such novel construction as to provide dependable boring at a high degree of precision in the small sizes and small increments of adjustment contemplated.

Another object of my invention is to provide an off-set boring head constructed in such novel manner as to eliminate the heretofore customary exposed bearing surfaces and to provide for effectively enclosing and sealing all bearing or working faces, whereby to exclude dirt and foreign material from such surfaces and to promote greater precision in operation.

Another object of my invention is to provide an off-set boring head characterized by a cylindrical tool slide which has precision sliding fit in a bore in the head and is entirely enclosed in said bore at one end by a dial adjusting screw and at the opposite end by a lock screw, which screws are operable to obtain the high precision settings and adjustments of the slide and its cutting tool.

Another object of my invention is to provide an off-set boring tool of such improved construction as to permit of precision manufacture thereof at a comparatively low cost.

Other objects and attendant advantages will be appreciated by those skilled in this art as the invention becomes better understood by reference to the following description when considered in connection with the accompanying drawings, in which—

Figure 1 is a face view of an off-set boring head embodying my invention, with a cutting tool held in operative position in the head;

Figure 2 is a top view of the head;

Figure 3 is a longitudinal section through the head taken substantially on the section line 3—3 of Figure 2;

Figure 4 is a cross-section taken substantially on the section line 4—4 of Figure 3 assuming Figure 3 shows the complete structure; and Figure 5 is a detail section taken substantially on the section line 5—5 of Figure 4.

2

Referring more particularly to the drawings, my invention provides a boring head body designated generally by 6, which is preferably of general cylindrical form for rotation about a longitudinal axis 7. The body 6 is suitably constructed at one end for support or mounting on a drive spindle or the like. In this case the head is provided with an internally threaded socket 8 for the reception of the threaded end 9 of a tapered shank 11 of conventional construction which is adapted to be seated in a spindle socket for supporting and rotating the head about the axis 7. A feature of my invention is the provision of a through bore 12 in the head on an axis perpendicular to and intersecting the axis 7, in which bore a tool slide 13 is mounted to a high degree of precision for accurate sliding adjustment and in which bore the slide is effectively enclosed and sealed against the admission of foreign matter. The tool slide, comprising a fully cylindrical block somewhat shorter in length than the bore, is bored through at about its center providing a tool socket 14 on an axis parallel with the axis 7 and coaxial therewith at one point in the tool setting as shown in Figure 3. A conventional single point boring tool 15 has a cylindrical shank closely fitting in the bore 14 with the cutting end extending through an opening 16 in the face of the head. This opening 16 is elongated in a direction parallel with the axis of the bore 12 and is confined to a size just sufficient to allow clearance for the cutting tool in its several adjusted positions. The bore 12 is accurately finished by honing and the cylindrical surface of the tool slide 13 is finished by grinding to provide a precision slide fit in the bore. Keys 17 and 18 fixed in key-ways at diametrically opposite sides of the tool slide have sliding fit in key-ways 19 in the head body extending from end to end of the bore 12 as shown in Figure 4. The head body is machined flat at each end of the bore 12 in a plane perpendicular to the bore and each flat surface 20 and 21 is ground to provide an accurate finish. Against one of these surfaces 20 is seated the thrust face 22 of a dial adjusting screw designated generally by 23 and against the other surface 21 is seated the thrust face 24 of a lock screw designated generally by 25. The adjusting screw 23 has at its inner end a screw portion 26 threaded into one end of the tool slide 13 coaxial therewith and at its outer end a dial 27. A retainer plate 28 has a ground face seated against the surface 20 and a retaining shoulder 29 seating against a complemental shoulder 31 on the adjusting screw. Suitable means such as cap screws 32 secure the retainer plate to the head body. This retainer plate accurately retains the adjusting screw 23 against axial displacement in either direction. The dial on the adjusting screw is graduated in coaction with vernier graduations on the retainer plate and with relation to the pitch of the thread 26 to provide increments of axial adjustment of the tool slide in the head body in the region of .0001". These proportions are used in actual practice and, obviously, other proportions and graduations might be used. In this connection the drawings show an actual full size embodiment of my invention for the precision boring of holes ranging from about ⅛" to 1" in diameter. The invention is, however, applicable to other sizes. The lock screw 25 has a threaded portion 33 threaded into the opposite end of the tool slide 13 coaxial therewith, as shown in Figure 3. The head of this lock screw seats against the surface 21 and a retainer plate 34 closely fits against the cylindrical surface of this screw head. Suitable means such as cap screws 35 (similar to the cap screws 32) fix the retainer plate 34 to the head body. The bore for the screw thread 33 in the tool slide is extended inwardly to provide a threaded bore 34 of reduced diameter for a set screw 36 which may be tightened to clamp against the tool shank 15 and fixedly hold the tool in the tool slide. An opening 37 axially through the lock screw 25 allows passage of a small hexagonal head wrench to the set screw 36 for tightening and loosening the latter.

From the foregoing it will be observed that the screw 25 may be tightened to lock the tool slide in the head. This tightening of the screw 25 clamps the thrust face 22 of the dial adjusting screw against the head surface 20 and also clamps the thrust face 24 of the lock screw against the head surface 21. This establishes a rigid locked relation of the parts in the head body. If it is desired to adjust the position or setting of the cutting edge 38 of the tool, the lock screw 25 is loosened and the dial screw 23 is rotatively moved to the desired setting, whereupon the lock screw 25 will be tightened to clamp the parts in the new setting. For convenience, the head of the dial screw has a hexagonal socket for reception of a hex wrench when making these adjustments.

With the foregoing construction a high degree in precision is obtained in these settings because there are no lost motion connections or back lash possibilities. Also it will be observed that in this construction all critical bearing or thrust surfaces are enclosed and protected from exposure to the exterior. For example, the tool slide 13 and the parts which have threaded coaction therewith, together with the thrust surfaces 22 and 24, are all effectively enclosed. This distinguishes from prior constructions in which bearing surfaces, dove-tails, tool slides, and the like are exposed and open to dirt and foreign matter. With my improved construction the several surfaces which are critical to high precision are protected at all times and the desired lubricant is preserved, thus promoting a greater degree of accuracy over a longer period of use. Another advantage of my invention is that the construction permits of machining and finishing operations of a comparatively inexpensive type or kind, thereby promoting economy in the cost of manufacture of the off-set boring head.

I claim:

1. An off-set boring head comprising a body having a mounting or the like at one end for rotation of the body about a longitudinal axis and having a cylindrical through bore of uniform diameter from end to end the axis of which is perpendicular to and intersects said axis of rotation, the body at each end of said bore being machined flat in a plane perpendicular to the axis of the bore to provide a flat surface at each end of such bore, a fully cylindrical tool slide fitting in said bore for sliding movement lengthwise therein, means coacting directly between the body and the tool slide to prevent rotative movement of the tool slide in said bore, a dial adjusting screw threaded in one end of the tool slide coaxial therewith and having a shoulder seating against the adjacent said flat surface to provide thrust engagement with the body, a lock screw threaded in the opposite end of the tool slide coaxial therewith and having a shoulder seating against the adjacent said flat surface to provide thrust engagement with the body, said thrust engagements being on opposite sides of the body and against said flat surfaces so that tightening of the lock screw will clamp the lock screw and the adjusting screw to the interposed body and will also lock the tool slide in the axial position in the bore to which it has been set by the dial adjusting screw, the tool slide having a tool-receiving socket on an axis substantially parallel with the axis of rotation of the body, the body having an opening through its end opposite from its mounting end communicating with said socket for passage of the shank end of a cutting tool into the tool socket, and means for fixedly securing the shank end of said cutting tool in the tool slide socket.

2. An off-set boring head as set forth in claim 1, in which the dial adjusting screw and the lock screw each is provided with the described shoulder to provide a head which has the described thrust engagement with the body and which also serves to close and seal the adjacent open end of the through bore, and in which the bore is wholly closed from the exterior except for the tool passage opening.

3. An off-set boring head as set forth in claim 1, including a set-screw threaded in the tool slide at the inner end of the lock screw coaxial therewith and extending into the tool socket for locking engagement with a tool shank therein, and the lock screw being provided with an axial opening for passage of a setting tool from the exterior to the set-screw for tightening and loosening the latter.

4. An off-set boring head as set forth in claim 1, including a retaining plate for the dial adjusting screw and another for the lock screw, each retaining plate having a flat face seating against the adjacent flat face on the body in a plane perpendicular to the axis of the through bore, each retaining plate having close-fitting engagement with its respective screw member, and cap screws clamping each retaining plate against its seat on the body.

5. An off-set boring head comprising a body having a spindle mounting or the like at one end for rotation of the body about a longitudinal axis and having a cylindrical through bore the axis of which is perpendicular to and intersects said axis of rotation, the body at each end of said bore being machined flat in a plane perpendicular to the axis of the bore to provide a flat surface at each end of such bore, a tool slide fitting in said bore for sliding movement lengthwise therein, a dial adjusting screw threaded in one end of the tool slide coaxial therewith and having a shoulder seating against the adjacent said flat surface to provide thrust engagement with the body, a lock screw threaded in the opposite end of the tool slide coaxial therewith and having a shoulder seating against the adjacent said flat surface to provide thrust engagement with the body, said thrust engagements being on opposite sides of the body and against said flat surfaces so that tightening of the lock screw will clamp the lock screw and the adjusting screw to the interposed body and will also lock the tool slide in the axial position in the bore to which it has been set by the dial adjusting screw, and means coaxial with said lock screw for fixedly securing a cutting tool to the tool slide.

HOWARD R. DE VLIEG.

References Cited in the file of this patent

UNITED STATES PATENTS

| Number | Name | Date |
|---|---|---|
| 2,330,692 | De Vlieg | Sept. 28, 1943 |
| 2,393,777 | Hughes et al. | Jan. 29, 1946 |
| 2,442,444 | Tautz | June 1, 1948 |